United States Patent [19]

Oishi et al.

[11] Patent Number: 4,943,497
[45] Date of Patent: Jul. 24, 1990

[54] CELL HAVING CURRENT CUTOFF VALVE

[75] Inventors: Shigeru Oishi; Takao Abe; Toru Nagaura; Mochiyuki Watanabe, all of Fukushima, Japan

[73] Assignee: Sony Corporation, Tokyo, Japan

[21] Appl. No.: 424,696

[22] Filed: Oct. 20, 1989

[30] Foreign Application Priority Data

Oct. 21, 1988 [JP] Japan .................................. 63-265783
Apr. 25, 1989 [JP] Japan .................................. 1-105197
Apr. 26, 1989 [JP] Japan .................................. 1-106584

[51] Int. Cl.⁵ ............................................ H01M 2/12
[52] U.S. Cl. ........................................ 429/53; 429/54
[58] Field of Search .................. 429/53, 54, 55, 56, 429/72, 61, 82

[56] References Cited

U.S. PATENT DOCUMENTS 3,556,863  1/1971  Nathe ..................................... 429/55
3,617,386 11/1971  Bosben et al. ...................... 429/56
3,622,397 11/1971  Belove ................................. 429/55
4,855,195  8/1989  Georgeopoulos et al. ........... 429/54

Primary Examiner—Anthony Skapars
Attorney, Agent, or Firm—Hill, Van Santen, Steadman & Simpson

[57] ABSTRACT

A cell having an explosion proof valve is disclosed, in which the valve is deformable upon increase of inner pressure of the cell to cut a connection lead which connects the valve with a generator unit contained in the cell. The supply of charging current is cut off when the inner pressure of the cell has abnormally increased. The gradual increase of the inner pressure can be effected by selecting suitable cathode active material.

5 Claims, 13 Drawing Sheets

X-ray Diffraction Pattern (y = 0)

X-ray Diffraction Pattern (y = 0.1)

X-ray Diffraction Pattern (y = 0.3)

X-ray Diffraction Pattern (y = 0.5)

X-ray Diffraction Pattern (y = 0.7)

X-ray Diffraction Pattern (y = 0.9)

CELL HAVING CURRENT CUTOFF VALVE

BACKGROUND OF THE INVENTION

The present invention relates to an explosion proof enclosed cell provided with explosion proof structure and also relates to an organic electrolytic secondary cell having such structure.

Lately, studies as to applicability of secondary cells such as lithium cells and carbon lithium cells to video tape recorders and watches are being made in various fields.

In such a cell as described above, it sometimes occurs that a chemical change in the generating element increases the internal pressure and causes an explosion. When, for example, a non-aqueous electrolytic cell such as an ordinary lithium secondary cell is put into an overcharged state by being supplied with a larger current than a normal current or put into a short-circuited condition by a misuse so that a large current is passed therethrough, it sometimes occurs that the electrolyte is decomposed to generate gas and the generated gas gradually fills up the cell, whereby internal pressure of the cell is increased and finally an explosion is caused.

To prevent such an explosion of a cell, there has been provided an explosion-proof safety device at the upper end portion of an armoring can 41, containing the generating element and serving also as the negative terminal, as shown in FIG. 1 or FIG. 2.

To be concrete, the safety device shown in FIG. 1 is attached to the topside of an insulating gasket 42 and formed of a lid plate 44 having a valve hole 43 made in the center thereof, an elastic valve body 47 made in a cylindrical form having a recess 45 formed therein with its bottom side made into a thin-walled portion 46, and a dished terminal plate 49 having a vent hole 48 made therein and arranged so as to cover the top of the elastic valve body 47, in which a cutting member 51 provided with a cutting edge 50 projecting toward the thin-walled portion 46 is disposed within the recess 45 of the elastic valve body 47.

According to the above described cell, as the generating element contained in the armoring can 41 causes a chemical change and the internal pressure of the armoring can 41 is increased, the thin-walled portion 46 of the elastic valve body 47 is expanded to move toward the cutting edge 50 provided on the cutting member 51. Then, the thin-walled portion 46 comes in abutment with the cutting edge 50, and as the internal pressure is further increased, the thin-walled portion 46 is ruptured by the cutting edge 50, whereby gas is exhausted into the air through the vent hole 48 made in the dished terminal plate 49 and explosion of the battery is prevented.

Further, the safety device shown in FIG. 2 is fitted in and supported by an insulating gasket 61 and formed of an intermediate lid 63 having a thin-walled portion 62 formed of grooves radially extended from the center and a closing lid 64 for closing the armoring can 41. Reference numeral 65 denotes a generating member constituting the generating element, which is formed of an anode material and a cathode material with separators impregnated with an electrolyte interposed therebetween and wound around a core 66 so as to form a cylinder. Reference numeral 67 denotes a lead terminal one end of which is attached to the cathode material in the cylindrically rolled form and the other end of which is led along the bottom side of an insulating plate 68, passed through a through hole 69, and attached to the bottom side of the intermediate lid 63 by welding. Reference numerals 70 and 71 denote vent holes for letting the generated gas from the generating element to outside the cell.

According to the described cell, as the gas is generated due to chemical changes in the generating element and the internal pressure of the armoring can 41 is increased, the intermediate lid 63 gradually bulges in the direction of the closing lid 64, and as the internal pressure is further increased, a rupture is caused at the thin-walled portion 62 formed in the intermediate lid 63 as shown in FIG. 3. As a result of the rupture, the gas which has been filling up the armoring can 41 is sent through the ruptured portion in the direction of the closing lid 64 and then exhausted into the air through the vent holes 70, 71, and thereby, explosion of the cell is prevented.

In the prior art explosion-proof enclosed cells as shown in FIG. 1 and FIG. 2, the increase in the internal pressure can be suppressed by the rupture of the safety valve (the elastic valve body 47 in the cell shown in FIG. 1 and the intermediate lid 63 in the cell shown in FIG. 2), but the charging current is continued to flow and the decomposition of electrolyte and active material is advanced so as to further elevate the temperature, and as a result, it sometimes occurs that the cell finally ignites. In FIG. 4 are shown changes with time of the cell voltage, charging current, and cell temperature when an overcharged state is kept up until the cell ignites (curves IV, V, and VI represent the cell voltage, charging current, and cell temperature).

The above described phenomenon occurs also in the event of short-circuiting. More particularly, if the shorting current is continued to flow even after the safety valve has been ruptured and thereby the increase in the internal pressure has been stopped, the temperature continues to rise finally causing the ignition.

By the rupture of the safety valve, such trouble can also be caused that the electrolyte leaks out of the cell through the ruptured portion and the vent hole.

DESCRIPTION OF THE PREFERRED EMBODIMENTS

An embodiment of the present invention will be described below with reference to FIG. 5 to FIG. 7.

Figure 1:
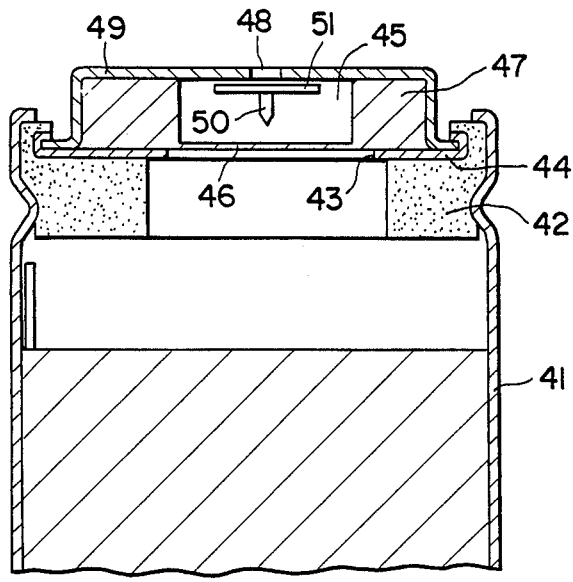
FIG. 1 to FIG. 3 are structural drawings of prior art explosion-proof cells.
Figure 2:
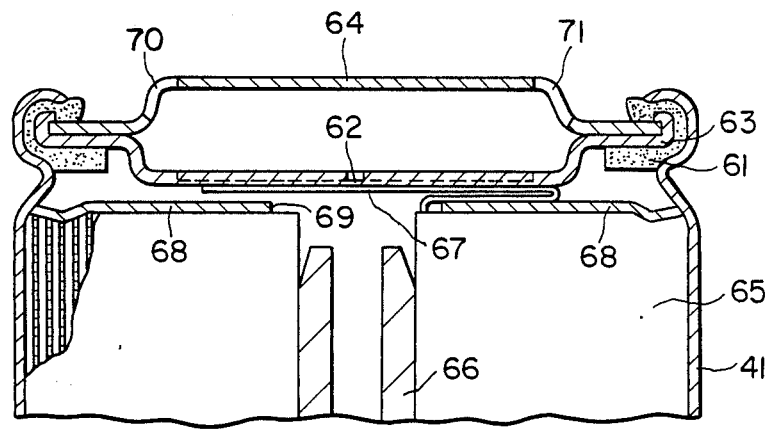
Figure 3:
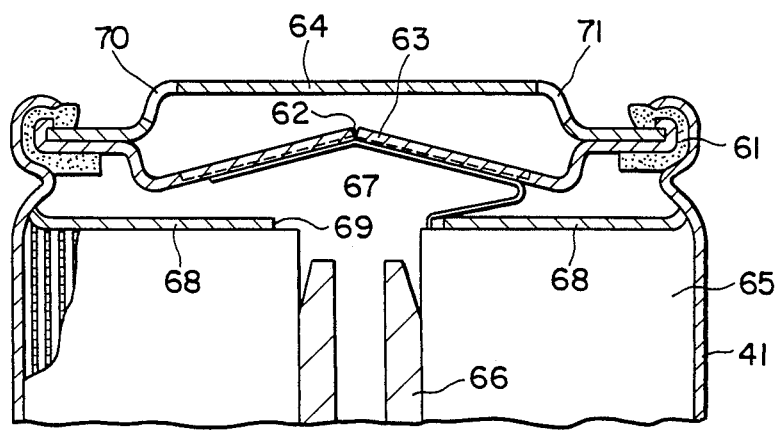
Figure 4:
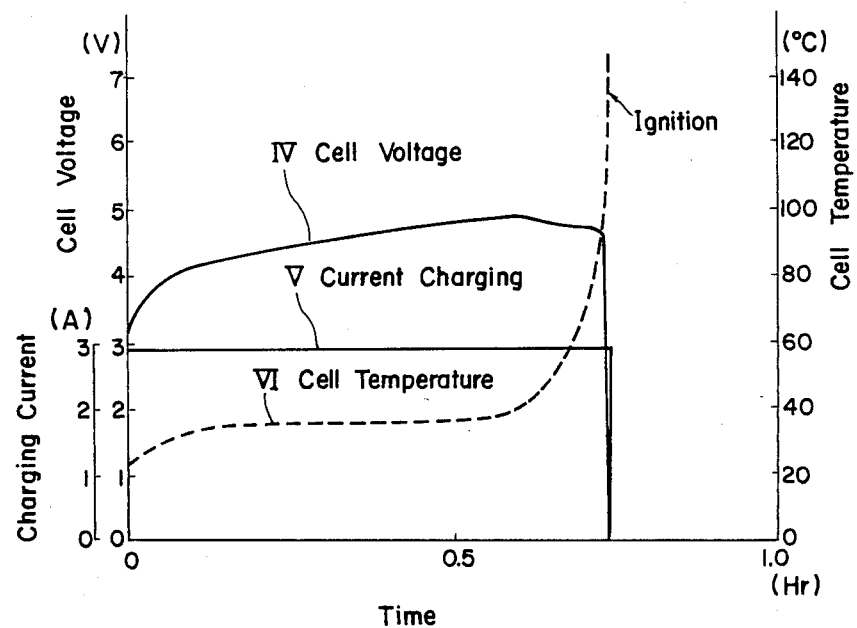
FIG. 4 shows characteristics of a prior art cell in an overcharging test.
Figure 5:
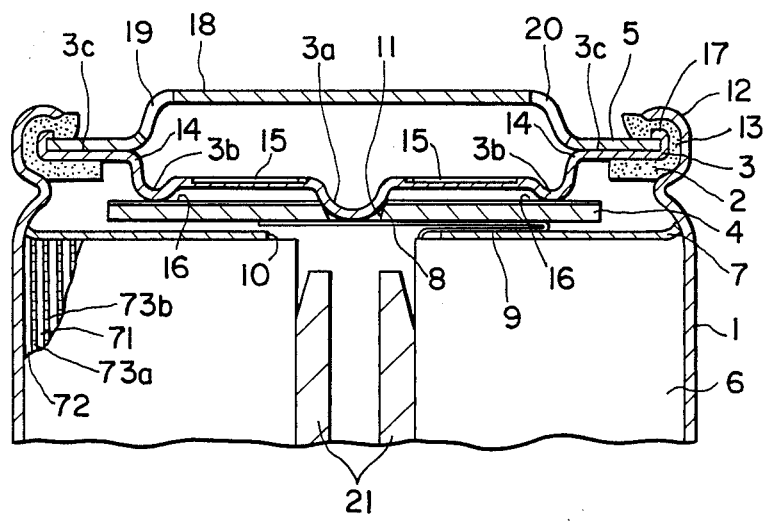
FIG. 5 and FIG. 7 are structural drawings of a cell according to the present invention.

An explosion-proof enclosed cell according to the present embodiment is generally constructed, as shown in FIG. 5, of an armoring can 1 in the form of a cylinder in which an generating element is contained, a gasket 2 provided on the inner peripheral surface at the upper end portion of the armoring can 1, an explosion-proof valve 3 fitted in and supported by the gasket 2 serving also as an intermediate lid, a stripper 4 provided under the explosion-proof valve 3 in contact therewith, and a closing lid 5 for closing the armoring can 1, of which the gasket 2, explosion-proof valve 3, and closing lid 5 are held in place by the armoring can 1 staked around the same.

Within the armoring can 1, there is contained a generating member 6 as the generating element, which is formed of an anode material (for example, metallic lithium foil) and a cathode material (for example, a cathode substrate with molybdenum sulfide spread over the same) having separators impregnated with an electrolyte interposed therebetween rolled around a core 21 so as to form a cylinder, and above the generating member 6, there is disposed an insulating plate 7 in the form of a sheet. In the center of the insulating plate 7, there is made a through hole 10 for passing a lead terminal 9 extended from a lead plate 8 therethrough. The lead terminal 9 is bent from the lead plate 8 and attached to the cathode material in the form of a cylindrical roll. The lead plate 8 is joined with the bottom side of a projection 3a of the later described explosion-proof valve 3 looking downward through an insertion hole 11 made in the later described stripper 4 by means of ultrasonic welding or the like. Here, the lead plate 8 is held so as to bridge between the bottom side of the stripper 4 and the projection 3a of the explosion-proof valve 3.

At the upper end portion of the armoring can 1 containing the generating element, there is formed a large-diameter portion 12 and the gasket 2 is fitted in this large-diameter portion 12. The gasket 2 is provided for sealing the inner periphery of the armoring can 1, so that the electrolyte impregnated in the separator contained in the armoring can 1 is prevented from leaking out of the cell, and, being formed of an insulating material such as a synthetic resin material, it also prevents short-circuiting between the cathode and the anode. The gasket 2 is made in an annular form, and its circumferential portion is formed into a vertical portion 13.

On the topside of the gasket 2, there is provided the explosion-proof valve 3. The explosion-proof valve 3 is made of aluminum, nickel, or an alloy of such metals in the form of a disk having a slightly smaller diameter than that of the gasket 2 and fitted in the inner periphery of the annular vertical portion 13 formed at the circumference of the gasket 2. Further, the explosion-proof valve 3 has an annular stepped portion 14 formed slightly inwardly of the inner edge of the gasket 2 and the portion coming down from the stepped portion 14 has an annular protrusion 3b protruding downward. In the center thereof, there is provided the projection 3a projecting down to the level lower than the protrusion 3b, and on the topside of the portion between the protrusion 3b and the projection 3a, there is provided a thin-walled portion 15 formed of grooves radiated from the vicinity of the base of the projection 3a.

The stripper 4 disposed below the explosion-proof valve 3 is formed of aluminum or the like and has the insertion hole 11 made in its center for inserting the projection 3a of the explosion-proof valve 3 therethrough, and on its topside, there is deposited an insulating film 16. The insulating film 16 may be formed of a nonwoven fabric, a polymeric thin film, a polymeric coating film, or the like. The lead plate 8 is welded to the bottom side of the projection 3a, being held so as to bridge between the bottom side of the stripper 4 and the bottom side of the projection 3a. Further, the circumferential portion on the outside of the stepped portion 14 of the explosion-proof valve 3 is formed into a plane portion 3c and the surface of the plane portion 3c and the later described plane portion of the closing lid 5 are put in contact with each other, whereby electrical connection is provided for the lead terminal 9, lead plate 8, explosion-proof valve 3, and the closing lid 5.

The circumferential portion of the explosion-proof valve 3 is formed into the plane portion 3c for obtaining such an effect that the plane portion 3c absorbs the downward deformation of the explosion-proof valve 3 to be produced when the cell is staked, so that the deformation may not adversely affect the thin-walled portion 15.

Above the explosion-proof valve 3, there is disposed the closing lid 5 face to face with the explosion-proof valve 3. The closing lid 5, serving as the cathode terminal, is formed into a disk with a smaller diameter than the diameter of the explosion-proof valve 3 and received by a flange portion 17 provided at the circumferential portion of the explosion-proof valve 3. The central portion of the same is formed into a bulging portion 18 bulging upwardly of the cell. The closing lid 5 is formed of a hard metallic material, which, in the present example, is made of a stainless steel plate and thereby the cell is reinforced. Further, the closing lid 5 has two vent holes 19 and 20 made in its bulging portion 18.

The gasket 2, the explosion-proof valve 3, and the closing lid 5 are held in place by the peripheral portion of the armoring can 1 staked from its outer periphery in the axial direction of the cell. Here, the explosion-proof valve 3 plus closing lid 5 and the armoring can 1 are formed integral with the gasket 2 interposed therebetween by the above described staking, and thereby, insulation of the cell is attained. More particularly, the circumferential portion of the gasket 2 is formed into the vertical portion 13, and within this vertical portion 13 are disposed the explosion-proof valve 3 and the closing lid 5, and further, at the outer periphery of the vertical portion 13 is located the peripheral wall portion 12 of the armoring can 1, and therefore, by staking the armoring can 1 from its outer periphery in the axial direction of the cell, the cell can be sealed with the armoring can 1 and the explosion-proof valve 3 plus closing lid 5 sandwiching the gasket 2 in between.

Thus, the explosion-proof valve 3 connected with the lead terminal 9 of the cathode and the closing lid 5 can be insulated from the armoring can 1 by means of the gasket 2.

Figure 6:
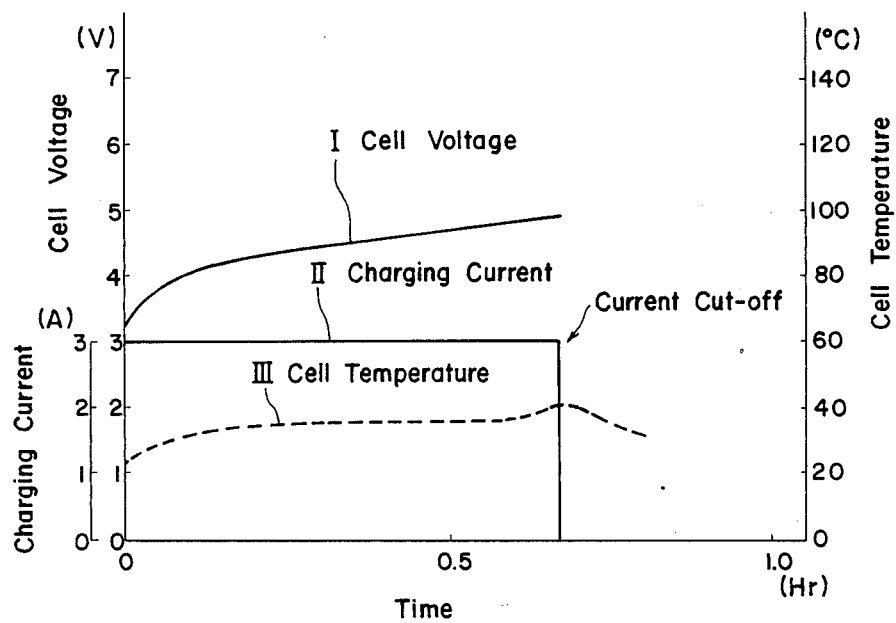
FIG. 6 shows characteristics of a cell according to the present invention in an overcharging test.
Figure 7:
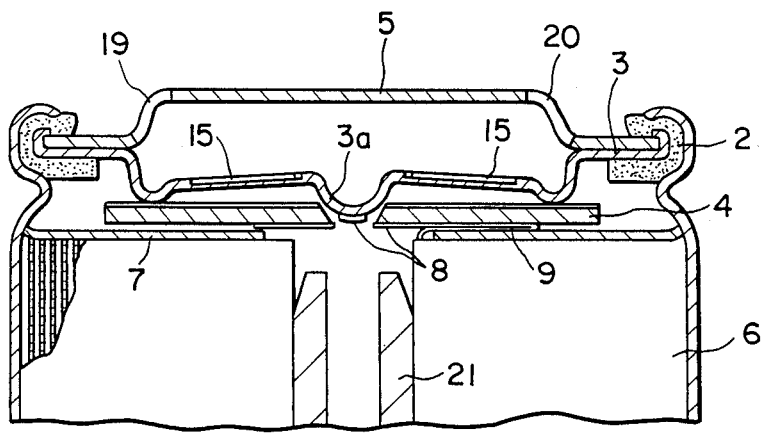

An overcharging test was performed on the cell constructed as described above according to the present embodiment and results as shown in FIG. 6 and FIG. 7 were obtained.

As shown in FIG. 6, as the charging proceeds, the cell voltage (curve I) rises and, in parallel with it, the cell temperature (curve III) also rises. As the cell is turned into an overcharged state, gas is generated to fill up the interior owing to chemical changes in the generating element, and with the gas filling up, the internal pressure of the cell starts to increase, and by the increase in the internal pressure, the explosion-proof valve 3 is deformed, or more particularly, the projection 3a of the explosion-proof valve 3 is pressed in the direction of the internal pressure, i.e., upward in the direction of the closing lid 5 as shown in FIG. 7. With the upward movement of the projection 3a, the lead plate 8 welded to the bottom side of the projection 3a ruptures at the welded portion, whereby the charging current is cut off (refer to curve II in FIG. 6). The cutoff of the current takes place where the slope of the cell temperature in the graph of FIG. 6 starts to rise. Thereafter, the cell temperature starts to fall, and thereby, such abnormalities as ignition or burst of the cell and leaking out of the electrolyte can be prevented.

According to the present example as described above, it becomes possible to cut off and stop the current flow earlier than the point of time when a safety valve in the prior art functions, namely, in the early stage of progress of abnormal reaction within the cell such as decomposition, so that the cell can be prevented from igniting or bursting.

Further, since the reaction can be stopped before the explosion-proof valve 3 is ruptured, the leaking out of the electrolyte can be prevented.

Also, when the cell is misused and externally shorted, such effects to prevent ignition or burst of the cell and leaking out of the electrolyte can be obtained by virtue of the current cutoff effected in the early stage of temperature rise due to the short-circuit current.

When a great amount of gas has been generated from the generating element as a result of extreme charging, the thin-walled portion 15 of the explosion-proof valve 3 is ruptured so that the gas is led toward the closing lid 5 and further exhausted into the air through the vent holes 19, 20.

Although the case where the projection 3a is lifted up by the internal pressure, whereby the lead plate 8 is ruptured and the current is cut off was shown in FIG. 7, it is also possible that the lead plate 8 is not ruptured but the lead plate 8 and the projection 3a are separated from each other at the welded portion so that the electric connection is broken.

Although, in the above embodiment radial grooves were formed to constitute the thin-walled portion 15 of the explosion-proof valve 3, the arrangement is not limited to that. A plurality of concentric grooves may be formed or one or two wide annular grooves may be formed, instead.

Figure 8:
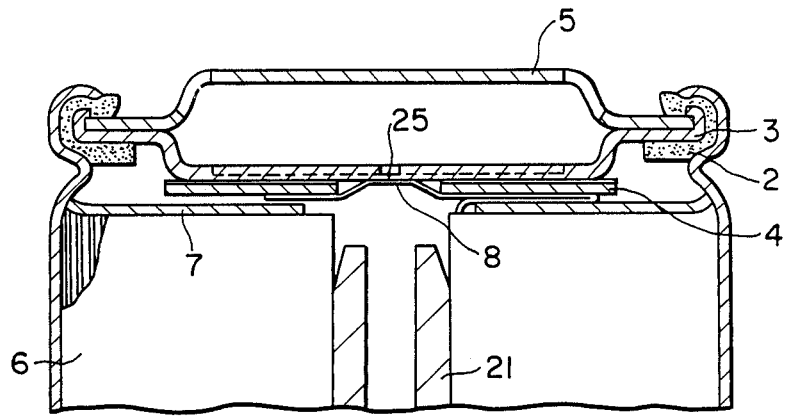
FIG. 8, FIG. 9, and FIG. 10A are structural drawings of another cell according to the present invention.

Although it was arranged in the above embodiment such that the projection 3a projecting downward is provided for the explosion-proof valve 3 at its central portion, the projection 3a is inserted into the insertion hole 11 made in the stripper 4, and then, the lead plate 8 located below the under side of the stripper 4 is welded to the bottom of the projection 3a being held so as to bridge between the under side of the stripper 4 and the bottom of the projection 3a, it may also be arranged, as shown in FIG. 8, such that the explosion-proof valve 3 is formed flat and the lead plate 8 is deformed to have a trapezoidal section, and then, its top portion is welded to the center of the bottom side of the explosion-proof valve 3. Also in this case, it is preferred that a thin-walled portion 25 similar to that in the first embodiment is provided for the explosion-proof valve 3.

Figure 9:
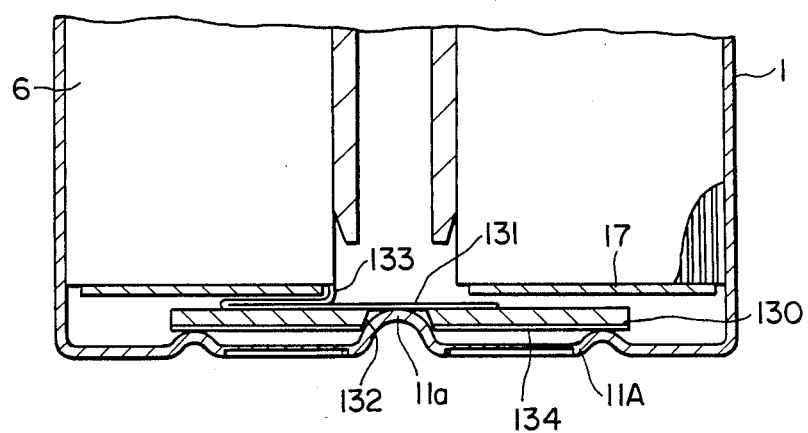

Although, in the above described first and second embodiments, the safety valve device was provided at the upper portion of the armoring can 1, that is, on the side of the cathode, it may be provided at the lower portion of the armoring can 1 as shown in a third embodiment of FIG. 9, namely, on the side of the anode. In the third embodiment, the bottom portion 11A of the armoring can 1 is made into the form reverse to that of the explosion-proof valve 3 used in the first embodiment, and on the interior of the same, there is provided, similarly to the first embodiment, a stripper 130, having an insulating layer 134 deposited on its side in abutment with the armoring can 1, and a lead plate 131 is welded to the topside of the projection 11a of the bottom portion 11A of the armoring can looking up through an insertion hole 132 made in the stripper 130, so as to be held to bridge between the topside of the stripper 130 and the projection 11a of the armoring can bottom portion 11A. Further, the end of a lead terminal 133 extended from the lead plate 131 is attached to the anode material formed in a cylindrical roll.

Although it is not shown, the bottom portion 11A of the armoring can in the third embodiment can be formed flat as in the second embodiment, and the lead plate 131 is deformed into the form of the letter U, and its bottom side is welded to the center of the topside of the armoring can bottom portion 11A.

Below will be described an example in which work efficiency is improved in assembling the above described current cutoff valve.

That is, in the case of the above described cell, the assembly is performed by placing, first, the insulating film 16 and, then, the lead stripper 4, on the explosion-proof valve 3, and then by welding the lead plate 8 with the projection 3a of the explosion-proof valve 3. These parts are generally rather small in size since they are put into a cylindrical cell of a diameter of, for example, 10-20 mm. Therefore, it is troublesome to handle these parts in the assembly work. When putting the assembled parts into a cell, in particular, a lack of carefulness causes these assembled parts to go to pieces, and hence, there is room for improvement of the work efficiency, and this hinders mass production and lowers the productivity.

Below will be described an embodiment in which the assembly work efficiency is improved with reference to FIG. 10 to FIG. 13. Throughout these drawings, corresponding parts to those in the prior art example shown in FIG. 5 are denoted by corresponding reference numerals and description thereof will be omitted here.

Figure 10A:
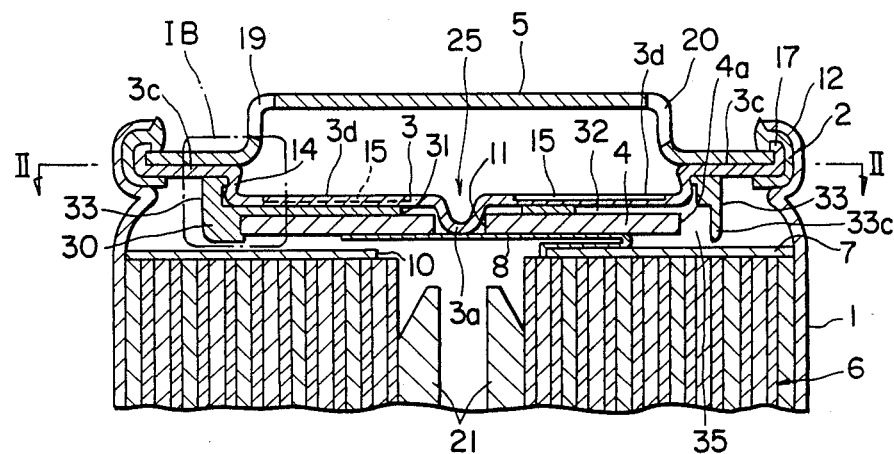
Figure 10B:
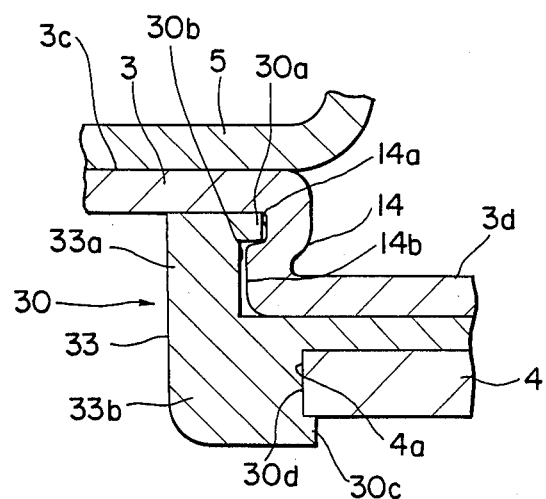
FIG. 10B is an enlarged view of the main portion of FIG. 10A.

FIG. 10A and FIG. 10B are longitudinal sectional views of a safety device 25 provided within a cell.

Referring to FIG. 10A and FIG. 10B, an explosion-proof valve 3 has an annular stepped portion 14 between a circumferential plane portion 3c and a central plane portion 3d. The central plane portion 3d is formed flat except where projection 3a and thin-walled grooves 15 are provided. By staking the base portion of the annular stepped portion 14, there is formed an annular groove 14a on the periphery of the annular stepped portion 14, whereby an annular projecting portion 14b outwardly projecting from the groove 14a is formed.

Figure 12A:
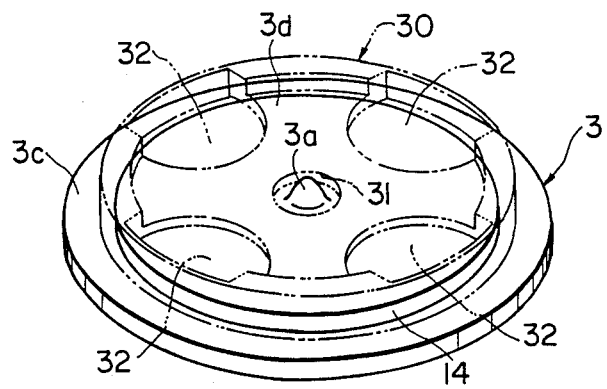
FIG. 12A to FIG. 12C are drawings for explaining order of assembling of a safety device according to the present invention.
Figure 12B:
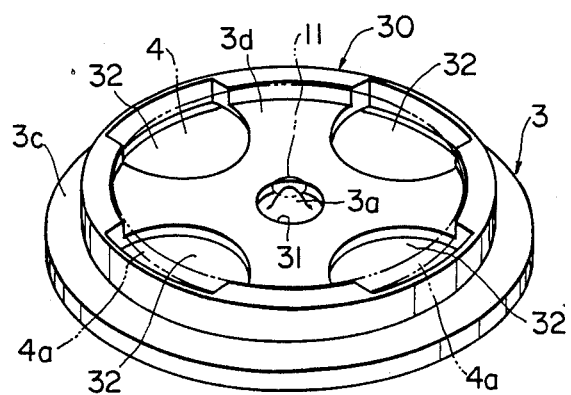

An intermediate fitting member 30 is made in the form of a disk, whose topside opposes the central plane portion 30d of the explosion-proof valve 3 and the bottom side thereof opposes the topside of a lead stripper 4 in the form of a disk with a vertical insertion hole 11 made therein in the center. At the circumferential portion of the intermediate fitting member 30, there is provided an annular vertical portion 33 projecting both upward and downward therefrom. On the inner periphery of the riser portion 33a at the upper side of the vertical portion 33, there are formed an annular groove 30b and an annular projecting portion 30a slightly projecting inward from the groove 30b. The down portion 33b at the lower side of the vertical portion 33 is divided into four discrete thick-walled portions as shown in FIG. 12B. On the inner periphery of the discrete thick-walled down portions 33b, there are formed accordingly discrete annular grooves 30d and accordingly discrete annular projecting portions 30c slightly projecting inward from the groove 30d. Since the thick-walled down portions 33b at the lower side of the intermediate fitting member 30 are formed to have a wall thickness greater than the wall thickness of the riser portion 33a at the upper side, the radius of the annular groove 30d is made smaller than the radius of the annular groove 30b by the difference in wall thickness.

Figure 11:
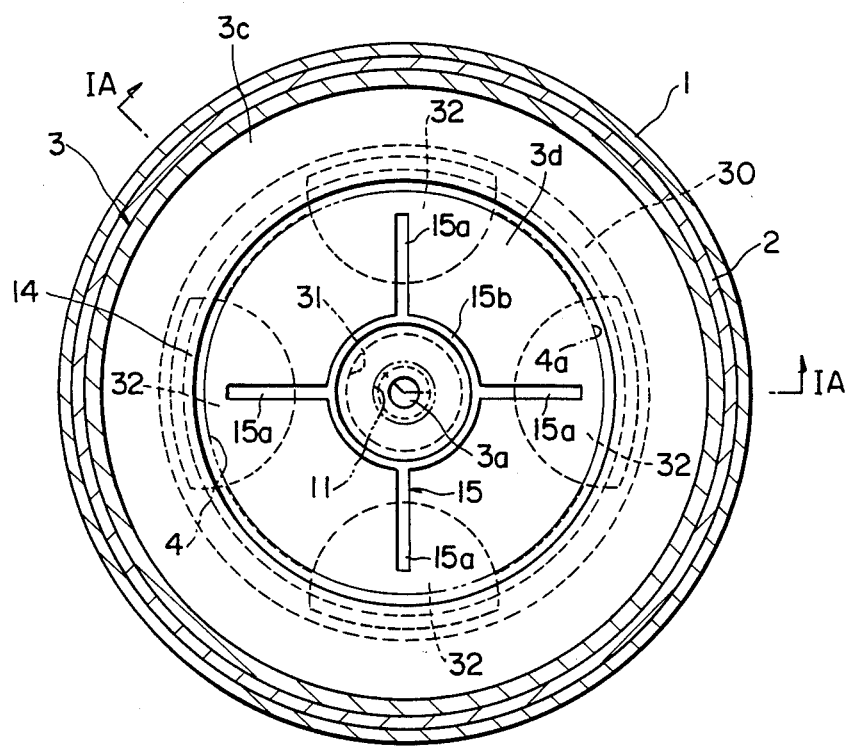
FIG. 11 is a transverse sectional view taken along line II–II of FIG. 10A.

FIG. 11 shows a transverse sectional view of the safety device 25 taken along line II—II of FIG. 10A. Referring to FIG. 11, the intermediate fitting member 30 has, in the center thereof, a center hole 31 larger than the insertion hole 11 in the lead stripper 4, and further has, at the positions of point symmetry about the center thereof, a plurality of vent holes 32 virtually of the form of a semicircle having its center virtually on the circumference of the circle passing along the inner periphery of the down portions 33b. Between the discrete thick-walled down portions 33b at the lower side, there are discretely formed thin-walled down portions 33c, whose wall was shaved off and made thin when the vent hole 32 was made as shown in FIG. 12B. Thus, the annular down portion at the lower side is formed of the thick-walled down portions 33b and the thin-walled down portions 33c, and the wall thickness of the down portion 33c at the lower side with its inner peripheral portion shaved off is made considerably smaller than the wall thickness of the down portion 33b. As to the riser portion 33a at the upper side, though there are present the vent holes 32, the projecting portion 30a and the the groove 30b are uniformly provided along the entire circumference.

Figure 12C:
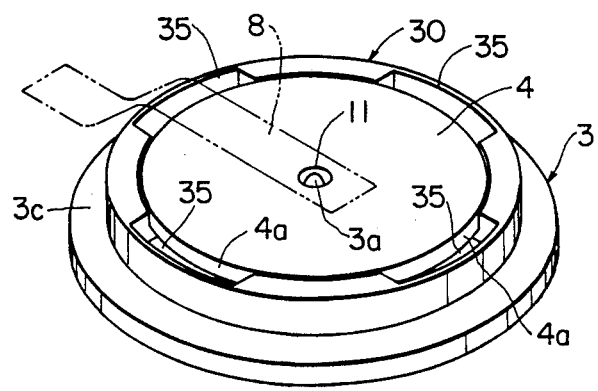

By virtue of the provision of the vent holes 32 in the intermediate fitting member 30 as described above, when the lead stripper 4 is fitted in the lower side of the intermediate fitting member 30, there are formed large gaps 35 between the peripheral surface 4a of the lead stripper 4 and the inner peripheral surfaces of the down portions 33c as shown in FIG. 12C so that the gap 35 communicates with the vent hole 32. Hence, the internal pressure of the cell is satisfactorily transmitted to the central plane portion 3d of the explosion-proof valve 3.

The intermediate fitting member 30 may be formed of a synthetic resin having resiliency such as PBT (polybutylene terephthalate), PP (polypropylene), and PEEK (polyether etherketone). Since any of these materials is an electric insulator, the need for using an insulating film 16 made of nonwoven fabric or the like as in the embodiment shown in FIG. 5 can be eliminated.

The explosion-proof valve 3, intermediate fitting member 30, lead stripper 4, and the lead plate 8 of the described structure can be assembled in the following manner. That is, the intermediate fitting member 30 is placed on the explosion-proof valve 3 having the projection 3a, and the intermediate fitting member 30 is pushed somewhat strongly. Then, as shown in FIG. 10A and FIG. 10B, the projecting portion 30a of the intermediate fitting member 30 rides across the projecting portion 14b of the explosion-proof valve 3 and comes into convex-to-concave engagement with the groove 14a of the explosion-proof valve 3. Thus, the explosion-proof valve 3 indicated by solid lines and the intermediate fitting member 30 indicated by chain lines in FIG. 12A are coupled together as a unit.

Thereafter, the lead stripper 4 placed on the intermediate fitting member 30 is pushed somewhat strongly. Then, the peripheral surface 4a of the lead stripper 4 rides across the projecting portion 30c of the intermediate fitting member 30 and comes into convex-to-concave engagement with the groove 30d of the intermediate fitting member 30. Thus, the explosion-proof valve 3 indicted by solid lines and the lead stripper 4 indicated by chain lines in FIG. 12B are coupled together as a unit, through the intermediate fitting member 30 indicated by solid lines therein. At this time, it is of course possible first to have the lead stripper 4 put into convex-to-concave engagement with the intermediate fitting member 30 and then to have the same put into convext-to-concave engagement with the explosion-proof valve 3. When handed in normal conditions, the thus integrated explosion-proof valve 3 and lead stripper 4 do not easily come off the intermediate fitting member 30. After that, the lead plate 8 indicated by chain lines in FIG. 12C is welded by ultrasonic welding or the like to the projection 3a, the head thereof peeping out of the insertion hole 11 of the lead stripper 4, of the explosion-proof valve 3.

Figure 13:
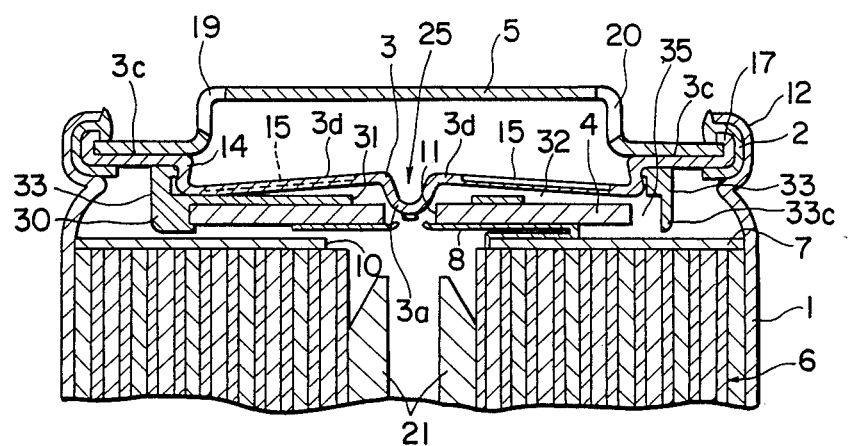
FIG. 13 is an explanatory drawing of a functioning state of a safety device according to the present invention.

Below will be described the operation which the safety device 25 performs for cutting off a current flow in response to an increase in the internal pressure with reference to FIG. 13. When the internal pressure of the cell is increased for the cause as described before, the internal pressure of the cell is transmitted to the central plane portion 3d of the explosion-proof valve 3 through the gaps 35 and the vent holes 32. Since the explosion-proof valve 3, together with the lid 5, is fixed at its circumferential plane portion 3c, the central portion including the projection 3a is held up as shown in FIG. 13 when the internal pressure of the cell reaches a predetermined value. As a result, the lead plate 8 at least partially comes off the explosion-proof valve 3 at the welded portion on the projection 3a or the lead plate 8 itself ruptures, and thereby the current is cut off.

As described above, the explosion-proof valve 3 and the lead stripper 4 can be readily put into convection-to-concave engagement with the intermediate fitting member 30 so that these members are coupled together as a unit and do not easily separate, and therefore, the assembly work of the safety device becomes easy. Further, since the lead stripper 4 is fixed to the explosion-proof valve 3, the work for welding the lead plate 8 to the lead stripper 4 also becomes easy. Thus, work efficiency in the assembly of the above described safety device can be much improved and in addition, the assembling can be performed more accurately to specification and hence, correct functioning of the safety device can be ensured and reliability on it can be improved.

Although, a lead plate 8 in the form of a thin plate was used as the lead in the above described embodiment, any form of it including that in line form can be used.

As described in the foregoing, the provision of the above described current cutoff valve for a secondary cell can prevent the cell from being broken due to increase in the internal pressure caused by decomposition of the electrolyte, but in the case where the increase in the internal pressure is not caused only by decomposition of the electrolyte, a further contrivance must be made.

As an example of such case, description will be given below as to an organic electrolytic secondary cell using $LiCoO_2$ as cathode active material.

First, lithium-cobalt composite oxide ($LiCoO_2$) used as the cathode active material is synthesized as described below. Lithium carbonate powder ($Li_2CO_3$) and cobalt carbonate ($CoCO_3$) available from the market are measured so that the ratio between lithium atoms and cobalt atoms becomes 1:1 and they are mixed well by the use of a vibrating mill, and then, they are baked by the use of an electric furnace in an atmosphere of air at 900° C. for five hours. Thereafter, the baked material is crushed by the use of an automatic mortar and thereby powder of $LiCoO_2$ is obtained.

Figure 14:
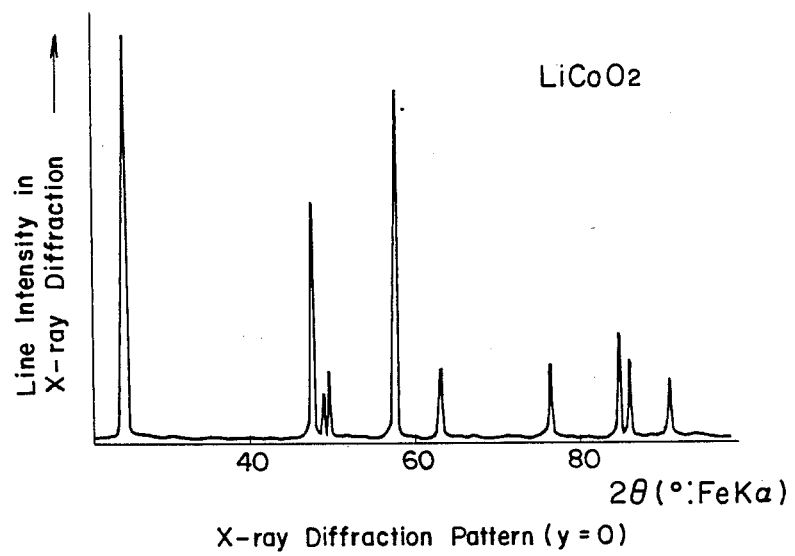
FIG. 14 to FIG. 19 are X-ray diffraction patterns of the cathode materials according to the present invention.
Figure 15:
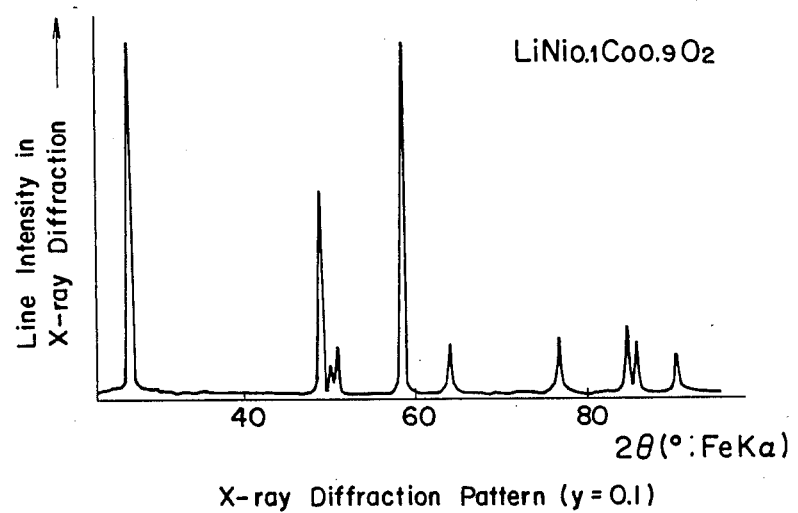
Figure 16:
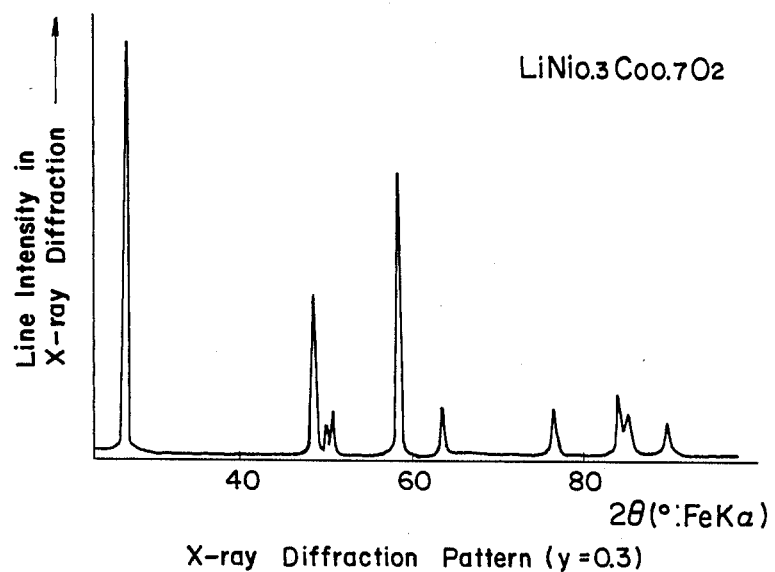
Figure 17:
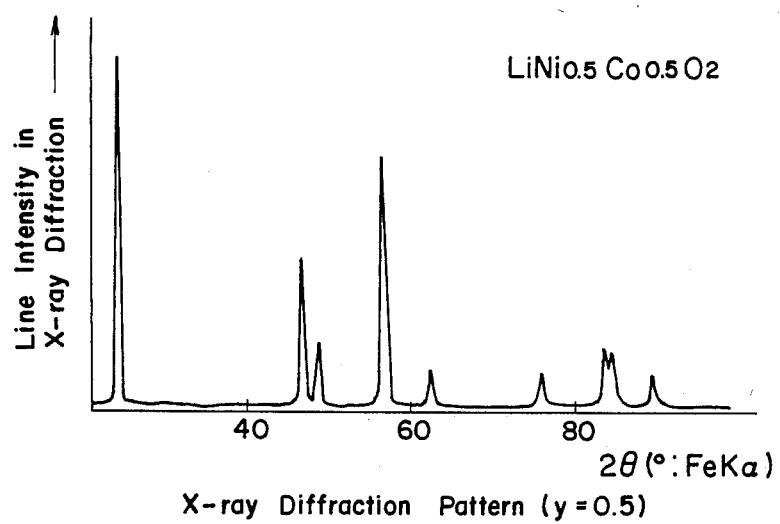
Figure 18:
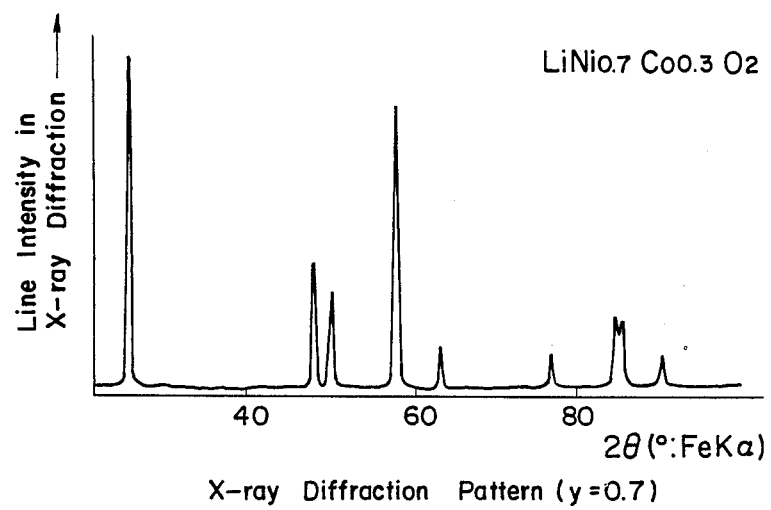
Figure 19:
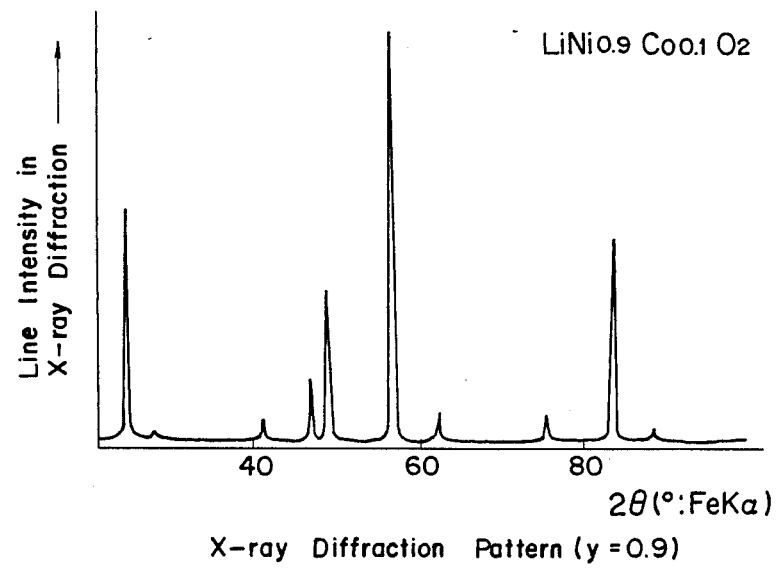

An X-ray diffraction pattern of $LiCoO_2$ obtained as described above is shown in FIG. 14. From the X-ray diffraction pattern, what had been produced by the above described producing method was confirmed to be in agreement with $LiCoO_2$ of the JCPDS (Joint Committee on Powder Diffraction Standards) cards which are widely used as standards of powder X-ray diffraction data.

Then, the cathode 71 is produced as follows. The lithium-cobalt composite oxide ($LiCoO_2$) synthesized as described above was used as the cathode active material, and a cathode compound is produced by adding 6 parts by weight of graphite as conducting material and 3 parts by weight of polyvinylidene fluoride as binding agent of 91 parts by weight of the cathode active material. Such cathode compound is dispersed in a solvent, N-methyl-2-pryolidone, whereby slurry is obtained. Then, the slurry of the cathode compound is uniformly spread over both sides of a band aluminium foil as a cathode collector and the product is dried, and thereafter, it is compression shaped by a roller press, and thereby, the cathode 71 in the form of a band is obtained.

The anode 72 is produced as described below. Crushed pitch coke is used as the anode active material. The pitch coke is 90 parts by weight and polyvinylidene fluoride as binding agent in 10 parts by weight are added and mixed up to thereby obtain an anode compound. The anode compound is dispersed in a solvent, N-methyl-2pyrolidone, whereby slurry is obtained. Then, the slurry of the anode compound is uniformly spread over both sides of a band copper foil as an anode collector and the product is dried. The dried product is compression-shaped by a roller press, and thereby, the anode 72 in the form of a band is obtained.

Thereafter, the band cathode 71, the band anode 72, and a pair of separators 73a and 73b made of porous polypropylene film of a thickness of 25 μm are laminated in the order of the anode 72, the separator 73a, the cathode 71, and the separator 73b and the laminate sheet is spirally wound around a core 21 a plurality of turns, and thereby, a rolled member is obtained.

A non-aqueous electrolytic secondary cell provided with a current cutoff device of the same structure as that in FIG. 5 is fabricated by using the above described rolled member and non-aqueous electrolyte (a mixture of propylene carbonate in which 1 mol/1 of lithium phosphate hexafluoride is dissolved and 1,2-dimethoxyethane). In the pesent case, the non-aqueous electrolytic secondary cell can be made, for example, in the form of a cylinder whose diameter is 20.5 mm and height is 42 mm and it can be used, when charged normally, at a voltage of approximately 4.1 V.

When 20 pieces of non-aqueous electrolytic secondary cells as described above were produced and charged with a current of 2 A for about 2 hours so that they were brought into an overchanged state, 18 cells (90%) exhibited such failures as generation of great heat accompanied by a rapid temperature rise and becoming damaged rather soon.

After intense investigation into the causes of the above trouble conducted by the present inventors, the following facts were known. That is, such an non-aqueous electrolytic secondary cell as described above, when overcharged and thereby the cell voltage is raised to approximately 4.8 V, the cathode active material ($LiCoO_2$) decomposes and generates oxygen gas. The oxygen gas reacts with lithium in the anode abnormally and rapidly, whereby the cell falls into the state of failure as described above. As shown in the later described FIG. 20. as behavior of a reference example, the internal pressure of the cell does not increase so much at the cell voltage of 4.8 V or so. Therefore, the abnormal reaction between the oxygen gas and lithium in the anode rapidly proceeds before the current cutoff device functions.

As the measures for preventing the above described overcharging in secondary cells, there are such an art, other than providing the current cutoff means for the cell itself, as providing an overcharge preventive function for the charging apparatus of the secondary cell. However, considering the case where cells are charged by charging appartus without such preventive function, it is imperative in achieving security that the current cutoff means as described above should positively operate. An object of the present invention is to provide a non-aqueous electrolytic secondary cell provided with the current cutoff means, in which the current cutoff means will function without fail in the event the non-aqueous electrolytic secondary cell is overcharged.

In order to achieve the above mentioned object, the present invention, in a non-aqueous electrolytic secondary cell including a cathode using a lithium compound as the cathode active material, an anode to which lithium can be doped and from which lithium can be dedoped, a non-aqueous electrolyte, and a current cutoff means functioning with an increase in the internal pressure, is arranged such that the cathode active material is constituted chiefly of a first active material and a second active material, of which the first active material is made of $Li_xNi_yCo_{1-y}O_2$ (where $0 < x \leq 1$ and $0 \leq y < 0.50$) and the second active material is made of $Li_{x'}Ni_{y'}Co_{1-y'}O_2$ (where $0 < x' \leq 1$ and $0.50 \leq y' < 0.90$).

It is desired that 0.514 70 parts by weight, or more preferably 2-50 parts by weight, of the second active material is included in 100 parts by weight of the total cathode active material.

In the above, each of the decribed first and second active materials 210 but it may be formed of two kinds or more of materials provided that these materials satisfy the above mentioned conditions.

As the anode active material for the anode, such material as metallic lithium, lithium alloy, conducting polymer such as polyacetylene, carbonaceous material such as coke can be used, any of which is such that lithium can be doped thereto and de-doped therefrom. As the non-aqueous electrolyte, such a non-aqueous electrolyte prepared by dissolving a salt of lithium as the electrolyte in an organic solvent (non-aqueous solvent) can be used.

Here, for the organic solvent, any of the following, for example, can be used as a single solvent, or two or more of them can be used as a mixed solvent: propylene carbonate, ethylene carbonate, 1.2-dimethoxyethane, 1,2-diethoxyethane, γ-butyrolactone, tetrahydrofuran, 1,3-dioxolane, 4-methyl-1,3-dioxolane, diethyl ether, sulfolane, methyl sulfolane, acetonitrile, propionitrile, etc. As the electrolyte, any of those hitherto known can be used such as $LiClO_4$, $LiAsF_6$, $LiPF_6$, $FiBF_4$, $LiB(C_6H_5)_4$, $LiCl$, $LiBr$, $CH_3SO_3Li$, $CF_3SO_3Li$, etc.

As the current cutoff means, the current cutoff means described with reference to FIG. 5 and FIG. 7 can be used, but it is not limited to that. Any one capable of cutting off a current flow according to an increase in the internal pressure may be used. In a non-aqueous electrolytic secondary cell using the cathode active material formed chiefly of the above described first active material and the second active material as the cathode, as the cell voltage is raised by overcharging, decomposition of the non-aqueous electrolyte is accelerated with the second active material acting as a certain catalyser and thereby gas is generated. As a result, the internal pressure of the cell is increased rather moderately. However, since the decomposing voltage to generate such decomposed gas is not so high as will cause the cathode active material to decompose and generate oxygen gas which will rapidly react with lithium in the anode, it is assured that the current cutoff means positively functions according to the increase in the internal pressure to a certain level of the cell, without causing such thing that the cell generates great heat rapidly or suffers damage rather soon. Hence, abnormal reaction in the cell due to overcharging can be prevented.

An embodiment with the present invention applied thereto will be described below with the reference to FIG. 5, FIG. 7, and FIG. 14 to FIG. 20.

In the present case non-aqueous electrolytic secondary cells provided with a current cutoff device were made quite in the same way as the above described example except that the composition of the cathode active material of the cathode 71 is different. The cathode 71 was prepared in the following way.

As the first active material, lithium-cobalt composite oxide ($LiCoO_2$) described in the reference example, i.e., $Li_xNi_yCo_{1-y}O_2$ where is virtually equal to 1 and y is 0, was used. As the second active material, lithium-nickel-cobalt composite oxide ($LiNi_{0.9}Co_{0.01}O_2$), i.e., $Li_xNi_yCo_{1-y}O_2$ where x is virtually equal to 1 and y is 0.9, was synthesized in the following way.

Powder lithium carbonate ($Li_2CO_3$), powder nickel carbonate ($NiCO_3$), and powder cobalt carbonate ($CoCo_3$) available from the market were measured so that ratios of lithium atoms, cobalt atoms, and nickel atoms would become 1:0.1:0.9, they were well mixed by the use of a vibrating mill, and then they were baked by the use of an electric furnace in an atmosphere of air at 900° C. for five hours. Thereafter, the baked material was crushed by an automatic mortar, and thus, powder of $LiNi_{0.9}Co_{0.1}O_2$ was obtained.

Unless otherwise noted, the value of x in $Li_x Ni_yCo_{1-y}O_2$ will hereinafter be virtually equal to 1.

Non-aqueous electrolytic secondary cells provided with a current cutoff device 25 as shown in FIG. 5 were fabricated using a mixture obtained by mixing 90% by weight of $LiCoO_2$ and 10% by weight of $LiNi_{0.9}Co_{0.1}O_2$ as described above as the cathode active material, and otherwise quite in the same way as described before. For convenience's sake, the present cells are labeled Cell I as shown in later mentioned Table 1.

In order to confirm the effect of the present invention, other lithium-nickel-cobalt composite oxides were synthesized in the same way as described above with the value of y in te above described $Li_xNi_yCo_{1-y}O_2$ changed to 0.3, 0.5, 0.7, and 1.0.

X-ray diffraction patterns of the above composite oxides are shown in FIG. 15 to FIG. 19. Even if the values of y in the lithium-nickel-cobalt composite oxides $Li_xNi_yCo_{1-y}O_2$ sythesized as described above are different, they are not different from the X-ray diffraction pattern (FIG. 14) obtained from the basic composition when y =0, i.e., $LiCoO_2$, only showing difference in the interplanar spacing according to the value of y. In other words, $LiCoO_2$ and $Li_xNi_yCo_{1-y}O_2$ are materials equal in crystal structure only differing in interlayer distances.

The way for obtaining the lithium-nickel-cobalt composite oxide is not limited to that used in the above described synthesizing example, but it can equally be synthesized by baking hydroxide or oxide of each of lithium, nickel, and cobalt. The banking temperature can be kept set within the range from 600° to 900° C.

Using each of the above five kinds of lithium-nickel-cobalt composite oxides singly as the cathode active material, non-aqueous electrolytic secondary cells A–F as shown in Table 1 were produced in the same way. Further, using mixtures of the above lithium-nickel-cobalt composite oxides and the lithium-cobalt composite oxide ($LiCoO_2$) mixed in the ratios by weight as shown in Table 1 as the cathode active material, non-aqueous electrolytic secondary cells G, H, J, and K were produced in the same way.

Here, the secondary cells H and I are the embodiments according to the present invention and the secondary cells A–G, J, and K are comparison examples.

TABLE 1

| Cell | Cathode Active Material | Percentage by Weight | Rate of Cells Failures |
|---|---|---|---|
| A | $LiNi_{0.1}Co_{0.9}O_2$ | 100% | 85% |
| B | $LiNi_{0.3}Co_{0.7}O_2$ | 100% | 80% |
| C | $LiNi_{0.5}Co_{0.5}O_2$ | 100% | 0% |
| D | $LiNi_{0.7}Co_{0.3}O_2$ | 100% | 0% |
| E | $LiNi_{0.9}Co_{0.1}O_2$ | 100% | 0% |
| F | $LiNiO_2$ | 100% | 0% |
| G | $LiCoO_2$ | 90% | |
|  | $LiNi_{0.1}Co_{0.9}O_2$ | 10% | 85% |
| H Embodiment | $LiCoO_2$ | 90% | |
|  | $LiNi_{0.5}Co_{0.5}O_2$ | 10% | 0% |
| I Embodiment | $LiCoO_2$ | 90% | |
|  | $LiNi_{0.9}Co_{0.1}O_2$ | 10% | 0% |
| J | $LiCoO_2$ | 90% | |
|  | $LiNiO_2$ | 10% | 0% |
| K | $LiCoO_2$ | 50% | |
|  | $LiNi_{0.1}Co_{0.9}O_2$ | 50% | 75% |
| Reference Example | $LiCoO_2$ | 100% | 90% |

Twenty each non-aqueous electrolytic secondary cells A–K were produced. They were charged by a current of 2A for 2 hours so that they were brought into overchanged state, and thereupon, rate of failures of the cells such as rapid generation of great heat or suffering damage relatively soon were checked. The results are shown in Table 1. The table also includes the case of the above described reference example.

Figure 20:
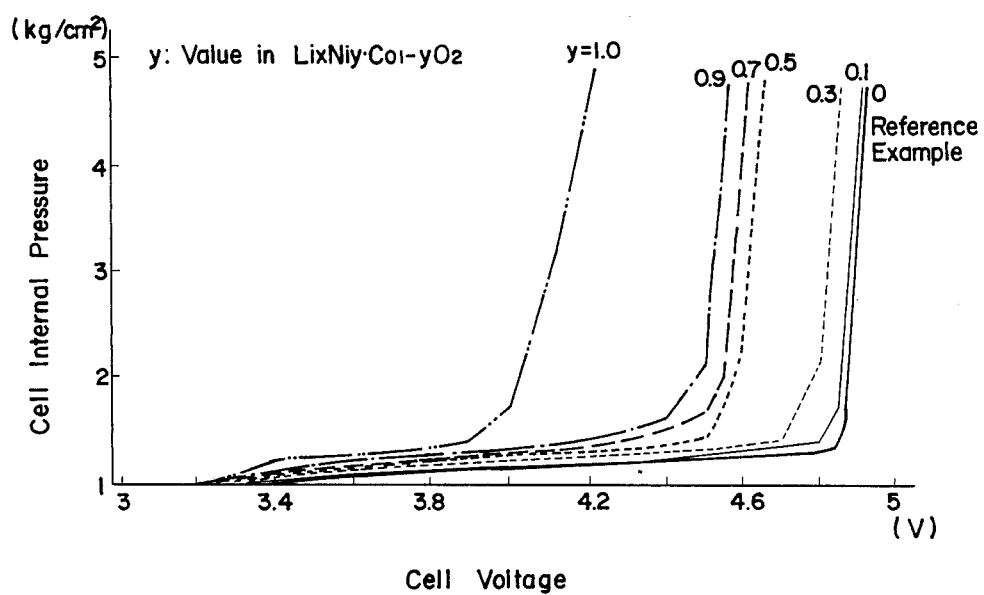
FIG. 20 is characteristics showing relationships between cell voltage and cell internal pressure.

To investigate the easiness in the decomposition of the electrolyte, cell voltages and cell internal pressures at the time of overcharging were measured on seven kinds of non-aqueous electrolytic secondary cells using each of seven kinds of composite oxides $Li_xNi_yCo_{1-y}O_2$ with y set to y = 0, 0.1, 0.3, 0.5, 0.7, 0.9, and 1.0 as cathode active material singly, and obtained the results as shown in FIG. 20. The case where y = 0, i.e., $LiCoO_2$ was used, is that of the reference example. The cells whose internal pressure had built up were disassembled and the generated gases were collected for analysis, and thereby, it was confirmed that the gases generated were that due to decomposition of the electrolyte. Therefore, it can be said that the increase in the internal pressure of the cells in FIG. 20 was due to the gas generated by decomposition of the electrolyte. From FIG. 20, it is known that the larger the value of y in $Li_xNi_yCo_{1-y}O_2$ is, the more easily the decomposed gas is generated, and hence, the decomposing voltage is lowered with increase in the value of y. That is, in each of the cases where y=0, i.e. $LiCoO_2$ was used, y=0.1 (reference example), i.e. $LiNi_{0.1}Co_{0.9}O_2$ was used, and y =0.3, i.e. $LiNi_{0.3}Co_{0.7}O_2$ was used, the decomposing voltage was about 4.8 V. In each of the cases where y=0.5, i.e. $LiNi_{0.5}Co_{0.5}O_2$ was used, y=0.7, i.e. $LiNi_{0.7}Co_{0.3}O_2$ was used, and y=0.9 i.e. $LiNi_{0.9}Co_{0.1}O_2$ was used, the decomposing voltage was about 4.5 V. And, where y=1.0, i.e. $LiNiO_2$ was used, the decomposing voltage was lowered to about 4.0 V.

These litium-nickel-cobalt composite oxides are considered to have a certain catalytic effect to accelerate the decomposition of the electrolyte.

When the rate of cells failures in the cells A -K in Table 1 is reviewed based on the conclusion obtained from FIG. 20, it is understood that the cells C, D, E, F, H, I, and J which include $Li_xNi_yCo_{1-y}O_2$ whose y is greater than 0.5 in any amount as the cathode active material are completely free from failure. That is, it is confirmed that, by adding even a little amount of the above described lithium-nickel-cobalt composite oxide to the lithium-cobalt composite oxide not including nickel, the effect is obtained such that the voltage at the time when the internal pressure of the cell starts to build up, i.e., the decomposing voltage of the electrolyte, is lowered.

Meanwhile, the cells A, B, G, and K which include $Li_xNi_yCo_{1-y}O_2$ whose y is smaller than 0.5 in any amount as the cathode active material exhibited considerable failure like the reference example. Namely, it can be said that the catalytic effect cannot be expected so much from $Li_xNi_yCo_{1-y}O_2$ whose y is smaller than 0.5.

Further, the cells F and J which include $LiNiO_2$ (y=0.1) in any amount as the cathode active material exhibited no failure but their electrolyte decomposed to increase the cell internal pressure and thereby the current cutoff device was actuated at an early stage of charging where the cell voltage was still low. Therefore, it was confirmed that these cells would not be practically used as a cell.

The art to use $Li_xNi_yCo_{1-y}O_2$ alone as a cathode active material for a non-aqueous electrolytic secondary cell, such as the above cells C, D, and E, has already been disclosed in Japanese Laid-open Patent Publication No. 63-299056. When the above described $Li_xNi_yCo_{1-y}O_2$ (where $y \neq 0$) is compared with $LiCoO_2$, the discharging voltage becomes somewhat lower, the energy density becomes lower, and self-discharging takes place more easily in the case of the former, where in particular the value of y is greater, than in the case of the latter.

In the case of the cells H and I , it was confirmed that the cells can use $LiCoO_2$ as the cathode active material which has a high discharging voltage, the current cutoff device positively operates before the charging voltage becomes so high that it causes failure of the cell, and therefore, such as state of failure is not brought about as the cell rapidly generates great heat or suffers damage rather soon.

Comparing the cells H and K with each other, it is known that the rates of failures of cells are quite different, though the mol ratios between nickel and cobalt in the cathode active materials are virtually equal.

From the above results, it is found that the cells in which decomposition of electrolyte takes place at voltages about 4.6 V or above are not preferable because, at the time of overcharging, decomposition of the cathode active material to generate oxygen gas simultaneously takes place as the decomposition of the electrolyte and the generated oxygen gas rapidly reacts with lithium in the anode. Also the cells in which decomposition of the electrolyte starts at voltages lower than 4 V are not preferable because the electrolyte decomposes even in a normal charging condition thereby actuating the current cutoff device.

More particularly, the electrolyte decomposes at a suitable voltage when lithium-nickel-cobalt composite oxide $Li_xNi_yCo_{1-y}O_2$ ($0.2 \leq x \leq 1$) whose value of y is within the range of 0.50-0.90 is mixed in the cathode active material. Mere rol ratio between nickel and cobalt in the cathode active material does not determine the decomposing voltage of the electrolyte. The effect of the lithium-nickel-cobalt composite oxide is obtained when 0.5% by weight, or more preferably 2% by weight, of the total cathode active material is included therein. Even if 70% by weight, or prefereably 50% by weight, is included, the discharging voltage is not lowered so much. As other cathode active material, a little amount of $LiMnO_2$ or the like may be included.

As the first cathod active material other than the above described $LiCoO_2$, $Li_xNi_yCo_{1-y}O_2$ ($0 \leq x \leq 1$, preferably $0.2 \leq x \leq 1$) where $0 < y < 0.5$ 0.5 can be used. Although the present embodiment was applied to the spiral type cylindrical secondary cell in the foregoing, the form of the cell is not limited to that but can be of any form provided that it is a non-aqueous electrolytic secondary cell including a current cutoff means to operate with an increase in the cell internal pressure. Further, the electolyte can be solid, in which case, a hitherto known solid electrolyte can be used.

We claim as our invention:
1. A cell comprising:
   a container having therein a generator unit formed of an anode, a cathode, a separator interposed between said anode and said cathode, and electrolyte;
   an explosion proof valve sealing said container;
   an electrical lead connected at one end to one of said anode or cathode and at the other end to said explosion proof valve; and a stripper element provided between said generator unit andd said explosion proof valve;
   said explosion proof valve being deformable upon increase of inner pressure of said container and said stripper element holding said electrical lead at a side of said generator unit to remove said electrical lead from said explosion proof valve upon deformation of said explosion proof valve.

2. A cell according to claim 1, wherein said stripper element has a through hole, through which said electrical lead is led out from said generator unit to said explosion proof valve.

3. A cell according to claim 1, wherein said stripper element and said explosion proof valve are unitized at peripheral portions thereof.

4. A cell according to claim 1, 2, or 3, wherein said stripper element is sealed with said container through an insulating gasket.

5. A cell comprising:

a container having therein a generator unit formed of an anode, a cathode, a separator interposed between said anode and said cathode, and electrolyte; and an explosion proof valve deformable upon increase of inner pressure of the cell to cut current supply to said generator unit;

said anode being formed of a material which can be doped and un-doped of lithium upon charging and discharging the cell, and said cathode being formed of a first cathode active material expressed by the first formula $Li_xNi_yCo_{1-y}O_2$ (wherein $0 < x \leq 1$, and $0 \leq y \leq 0.50$) and a second cathode active material expressed by the second formula $Li_{x'}Ni_{y'}Co_{1-y'}O_2$ (wherein $0 < x' \leq 1$, and $0.50 \leq y' \leq 0.90$).

* * * * *